US010258970B2

(12) United States Patent
Aga et al.

(10) Patent No.: US 10,258,970 B2
(45) Date of Patent: *Apr. 16, 2019

(54) FERRITE PARTICLES PROVIDED WITH OUTER SHELL STRUCTURE FOR CATALYST SUPPORTING MEDIUM

(71) Applicant: POWDERTECH CO., LTD., Chiba (JP)

(72) Inventors: Koji Aga, Chiba (JP); Takao Sugiura, Chiba (JP)

(73) Assignee: POWDERTECH CO., LTD., Chiba (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/544,665

(22) PCT Filed: Jan. 26, 2016

(86) PCT No.: PCT/JP2016/052151
§ 371 (c)(1),
(2) Date: Jul. 19, 2017

(87) PCT Pub. No.: WO2016/121743
PCT Pub. Date: Aug. 4, 2016

(65) Prior Publication Data
US 2018/0008966 A1  Jan. 11, 2018

(30) Foreign Application Priority Data

Jan. 28, 2015  (JP) ................................. 2015-013794

(51) Int. Cl.
*B01J 23/00*  (2006.01)
*B01J 23/745*  (2006.01)
(Continued)

(52) U.S. Cl.
CPC ......... *B01J 23/8892* (2013.01); *B01J 23/002* (2013.01); *B01J 23/005* (2013.01);
(Continued)

(58) Field of Classification Search
CPC ...... B01J 23/56; B01J 23/745; B01J 23/8906; B01J 35/0006; B01J 35/04; B01J 23/002;
(Continued)

(56) References Cited

U.S. PATENT DOCUMENTS 3,163,519 A  * 12/1964  Hanson ................. C22B 1/2406
428/403
4,201,827 A  5/1980  Heitkamp et al.
(Continued)

FOREIGN PATENT DOCUMENTS

EP  3032335 A1  6/2016
JP  H06-313176 A  11/1994
(Continued)

OTHER PUBLICATIONS

Japanese Office Action from Patent Application No. JP2015-013794, dated Apr. 18, 2017.
(Continued)

*Primary Examiner* — Cam N. Nguyen
(74) *Attorney, Agent, or Firm* — Greenblum & Bernstein, P.L.C.

(57) ABSTRACT

An object of the present invention is to provide ferrite particles for supporting a catalyst having a small apparent density, various properties are maintained in a controllable state and a specified volume is filled with a small weight, and a catalyst using the ferrite particles for supporting a catalyst. To achieve the object, ferrite particles for supporting a catalyst provided with an outer shell structure containing Ti oxide, a catalyst using the ferrite particles for supporting a catalyst are employed.

19 Claims, 4 Drawing Sheets

(51) Int. Cl.
| | |
|---|---|
| *B01J 23/889* | (2006.01) |
| *B01J 23/89* | (2006.01) |
| *B01J 32/00* | (2006.01) |
| *B01J 35/00* | (2006.01) |
| *C01G 23/047* | (2006.01) |
| *C01G 49/00* | (2006.01) |
| *G03G 9/107* | (2006.01) |
| *G03G 9/113* | (2006.01) |
| *B01J 35/02* | (2006.01) |
| *B01J 37/08* | (2006.01) |
| *B01J 37/16* | (2006.01) |
| *B01J 37/00* | (2006.01) |
| *B01J 37/02* | (2006.01) |

(52) U.S. Cl.
CPC ........... *B01J 23/745* (2013.01); *B01J 23/889* (2013.01); *B01J 23/89* (2013.01); *B01J 23/892* (2013.01); *B01J 23/8906* (2013.01); *B01J 23/8913* (2013.01); *B01J 23/8926* (2013.01); *B01J 23/8986* (2013.01); *B01J 32/00* (2013.01); *B01J 35/0006* (2013.01); *B01J 35/008* (2013.01); *B01J 35/0013* (2013.01); *B01J 35/0026* (2013.01); *B01J 35/023* (2013.01); *C01G 23/047* (2013.01); *C01G 49/0072* (2013.01); *G03G 9/107* (2013.01); *G03G 9/113* (2013.01); *G03G 9/1139* (2013.01); *B01J 35/002* (2013.01); *B01J 35/004* (2013.01); *B01J 35/0033* (2013.01); *B01J 37/0018* (2013.01); *B01J 37/0036* (2013.01); *B01J 37/0063* (2013.01); *B01J 37/0211* (2013.01); *B01J 37/088* (2013.01); *B01J 37/16* (2013.01); *B01J 2523/00* (2013.01); *C01P 2002/50* (2013.01); *C01P 2002/52* (2013.01); *C01P 2004/03* (2013.01); *C01P 2004/84* (2013.01); *C01P 2006/12* (2013.01); *C01P 2006/14* (2013.01); *C01P 2006/16* (2013.01)

(58) Field of Classification Search
CPC .... B01J 23/005; B01J 23/889; B01J 23/8892; B01J 23/89; B01J 23/8913; B01J 23/892; B01J 23/8926; B01J 23/8986; B01J 32/00; B01J 35/0013; B01J 35/002; B01J 35/0026; B01J 35/008; B01J 35/023; C01G 23/047; C01G 49/0072; G03G 9/107; G03G 9/113; G03G 9/1139
See application file for complete search history.

(56) References Cited

U.S. PATENT DOCUMENTS

| | | | | |
|---|---|---|---|---|
| 4,925,762 | A * | 5/1990 | Ostertag | G03G 9/1075 427/216 |
| 5,654,120 | A * | 8/1997 | Hakata | G03G 9/10 430/111.32 |
| 6,780,555 | B2 * | 8/2004 | Uchida | G03G 9/0831 106/456 |
| 6,818,297 | B1 | 11/2004 | Atarashi et al. | |
| 9,372,426 | B2 * | 6/2016 | Aga | G03G 9/1075 |
| 2005/0277049 | A1 * | 12/2005 | Katoh | G03G 9/1075 430/111.35 |
| 2006/0251982 | A1 * | 11/2006 | Iwatsuki | G03G 9/1075 430/111.1 |
| 2007/0281160 | A1 | 12/2007 | Krishna et al. | |
| 2008/0160440 | A1 * | 7/2008 | Nishikawa | G03G 9/1075 430/108.6 |
| 2009/0239173 | A1 * | 9/2009 | Kobayashi | G03G 9/1131 430/111.31 |
| 2009/0246526 | A1 | 10/2009 | Sugiura et al. | |
| 2018/0008921 | A1 * | 1/2018 | Aga | B01D 39/06 |
| 2018/0011414 | A1 * | 1/2018 | Aga | G03G 9/1075 |

FOREIGN PATENT DOCUMENTS

| | | |
|---|---|---|
| JP | 2000-237542 A | 9/2000 |
| JP | 2000-355663 A | 12/2000 |
| JP | 2002-093614 A | 3/2002 |
| JP | 2004-189513 A | 7/2004 |
| JP | 2007-320847 A | 12/2007 |
| JP | 2009-234839 A | 10/2009 |
| JP | 2013-205689 A | 10/2013 |
| JP | 2014-182304 A | 9/2014 |
| KR | 2012-0021570 A | 3/2012 |
| WO | WO2005/067985 A | 7/2005 |

OTHER PUBLICATIONS

International Search Report from Patent Application No. PCT/JP2016/052151, dated Mar. 8, 2016.
Kumar, et al., "Photo-induced reduction of CO2 using a magnetically separable Ru—CoPc@TiO2@SiO2@Fe3O4 catalyst under visible light irradiation", Dalton Transactions, 2015, vol. 44, pp. 4546-4553.
Zhan, et al., "Magnetic photocatalysts of cenospheres coated with Fe3O4/TiO2 core/shell nanoparticles decorated with Ag nanoparticles", Ceramics International, 2014, vol. 40, pp. 8547-8559.
Hyun, et al., "Synthesis of magnetically separable core@shell structured NiFe2O4@TiO2 nanomaterial and its use for photocatalytic hydrogen production by methanol/water splitting", Chemical Engineering Journal, 2013, vol. 243, pp. 272-279.
Supplementary European Search Report issued in Appl. No. EP16743346.5, dated Jul. 13, 2018.

* cited by examiner

FERRITE PARTICLES PROVIDED WITH OUTER SHELL STRUCTURE FOR CATALYST SUPPORTING MEDIUM

TECHNICAL FIELD

The present invention relates to ferrite particles, and more particularly to ferrite particles for supporting a catalyst which is suitably used as a catalyst supporting medium and a catalyst using the ferrite particles as a catalyst supporting medium.

BACKGROUND ART

Ferrite particles are used in various applications. For example, Patent Document 1 (Japanese Patent Laid-Open No. 6-313176) discloses a fluid catalytic cracking catalyst composed of zeolite as active component and a support matrix wherein the matrix contains ferrite particles having a saturation magnetization of 10 emu/g or less and an average particle diameter of 0.001 to 20 μm.

Patent Document 2 (Japanese Patent Laid-Open No. 2004-189513) discloses a manufacturing method of a functional ferrite particles including the steps of attaching glass particles on the surface of ferrite particles to provide a coating layer of molten glass, applying a coating of titanium oxide on the surface of the ferrite particles provided with glass followed by heat-treating. The functional ferrite particles are useful as photocatalytic material. Examples of the ferrite particles used include Mn—Zn type ferrite, Mg—Cu—Zn type ferrite, and Ni—Cu—Zn type ferrite.

Although Patent Document 1 and 2 disclose that the ferrite particles are used as a catalyst, various properties of the ferrite particles are not focused.

Patent Document 3 (Japanese Patent Laid-Open No. 2007-320847) discloses products containing a plurality of a core fine particle structure containing a plurality of primary fine particles and a plurality of primary pores, and core-shell ceramic fine particles containing a shell surrounding at least a part of the core fine particle structure. The products include a membrane, a sensor, an electrode, and a getter.

The core-shell ceramic fine particles described in Patent Document 3 include a core of yttrium stabilized zirconia and a shell of lanthanum ferrite. So, the ferrite particles are not small in the apparent density, various properties are not maintained in the controllable state and do not fill a specified volume with a small weight because lanthanum ferrite is used as the shell.

DOCUMENTS CITED

Patent Documents

Patent Document 1: Japanese Patent Laid-Open No. 6-313176
Patent Document 2: Japanese Patent Laid-Open No. 2004-189513
Patent Document 3: Japanese Patent Laid-Open No. 2007-320847

SUMMARY OF INVENTION

Problems to be Solved

An object of the present invention is to provide ferrite particles for supporting a catalyst having a small apparent density, various properties are maintained in a controllable state and fills a specified volume with a small weight, and a catalyst using the ferrite particles as a catalyst supporting medium.

Means to Solve the Problem

Through extensive investigation to solve the problems described above, the present inventors thought out that ferrite particles provided with an outer shell structure containing a Ti oxide can achieve the object, and the present invention was accomplished. The present invention was made based on the knowledge.

The present invention provides ferrite particles for supporting a catalyst characterized in provided with an outer shell structure containing Ti oxide.

The ferrite particles according to the present invention is preferable that the thickness of the outer shell structure is 0.5 to 10 μm.

The ferrite particles according to the present invention is preferable that the density of the internal part is smaller than that of the outer shell structure.

The ferrite particles according to the present invention is preferable that the volume average particle diameter is 10 to 100 μm.

The present invention provides a catalyst characterized in using the ferrite particles as a catalyst supporting medium.

The catalyst according to the present invention is preferable that a catalytically active component is at least one colloidal particle of a metal selected from gold, silver, copper, platinum, rhodium, ruthenium, palladium, nickel, and cobalt.

Advantages of the Invention

As the ferrite particles according to the present invention are provided with an outer shell structure containing titanium, the ferrite particles have a small apparent density and various properties maintained in a controllable state, and fill a specified volume with a small weight. As a result, a catalyst using the ferrite particle as a catalyst supporting medium which supports a catalytically active component achieves suitable dispersion of the catalytically active component on the catalyst supporting medium.

PREFERRED EMBODIMENTS OF THE INVENTION

The embodiment of the present invention will be described in the following.
<Ferrite Particles According to the Present Invention>
The ferrite particles according to the present invention have the outer shell structure containing titanium. As a result, the ferrite particles is small in the apparent density and have various properties maintained in a controllable state. In addition, the ferrite particles according to the present invention fill a specified volume with a small weight of the ferrite particles. The words "ferrite particles" in the present invention refer to a mass of individual ferrite particles unless otherwise noted, and the word "particles" refer to individual ferrite particles.

The outer shell structure provided should be visually recognized in the cross-sectional image of ferrite particles embedded in a resin observed with SEM. More specifically, the outer shell structure is the outer periphery having a thickness in a certain range accounting for 80% or more of the proportion in the circumferential length. The proportion in the outer peripheral circumferential length is more preferable to be 90% or more.

The thickness of the outer shell structure is preferable to be 0.5 to 10 μm to achieve the intended object. If the thickness of the outer shell structure is less than 0.5 μm, the ferrite particles are weak in mechanical strength, and the various essential powder properties may not be achieved due to breakage. In particular, breakage generated in use as a carrier may cause scratches on a photo conductor drum. If the thickness of the outer shell structure exceeds 10 μm, the ferrite particles provided with the outer shell structure have no difference from the conventional ferrite particles, and no desired effect is achieved. The thickness of the outer shell structure is more preferable to be 0.5 to 8 μm, most preferable to be 0.5 to 6.5 μm.

Figure 1:
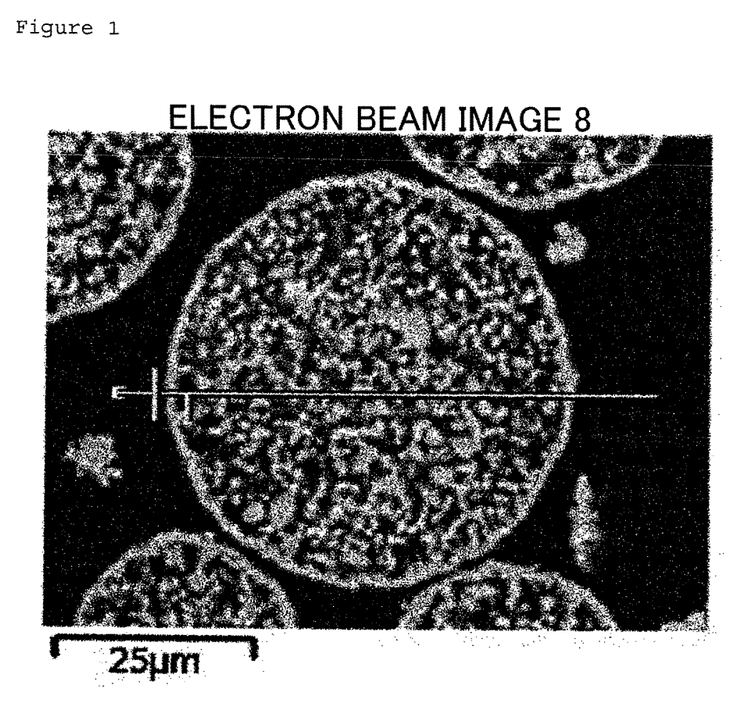
FIG. 1 is the electron micrograph (×200) on the cross section of the ferrite particles according to the present invention, showing the method of determining the thickness of the outer shell structure.
Figure 2:
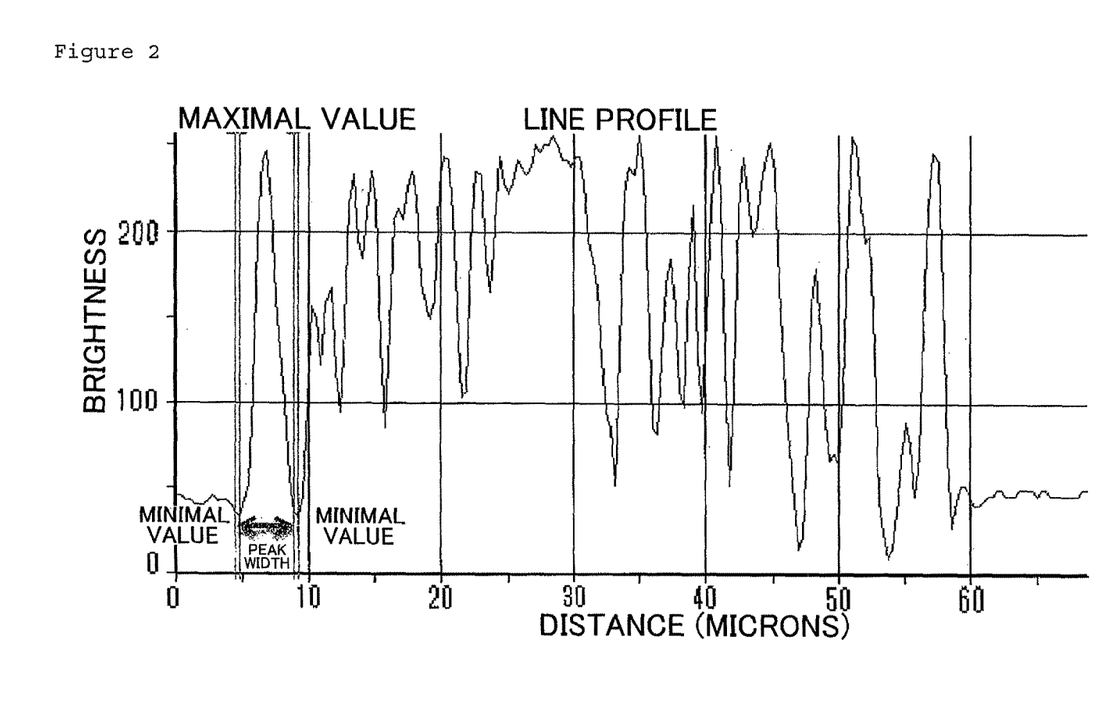
FIG. 2 is the image analyzed graph of the image in FIG. 1.
Figure 3:
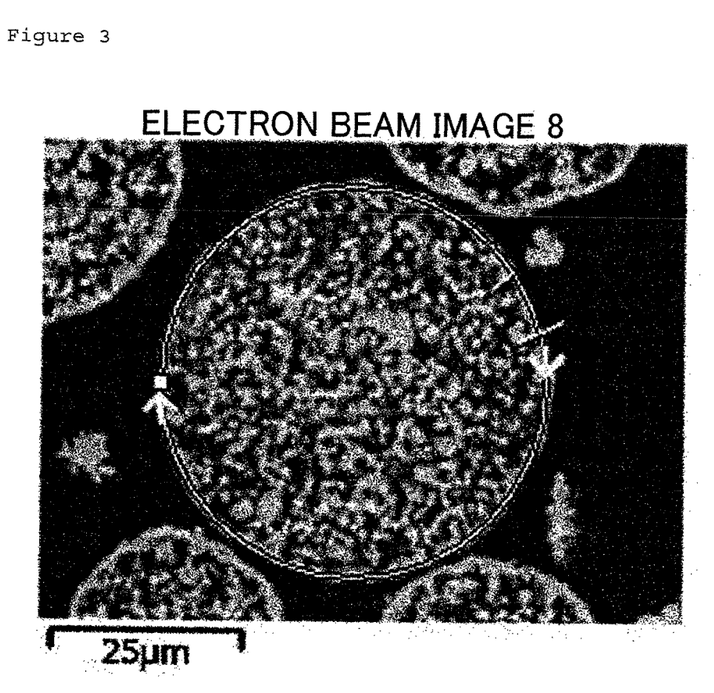
FIG. 3 is the electron micrograph (×200) showing the method of determining the proportion of the outer shell structure in the outer periphery.
Figure 4:
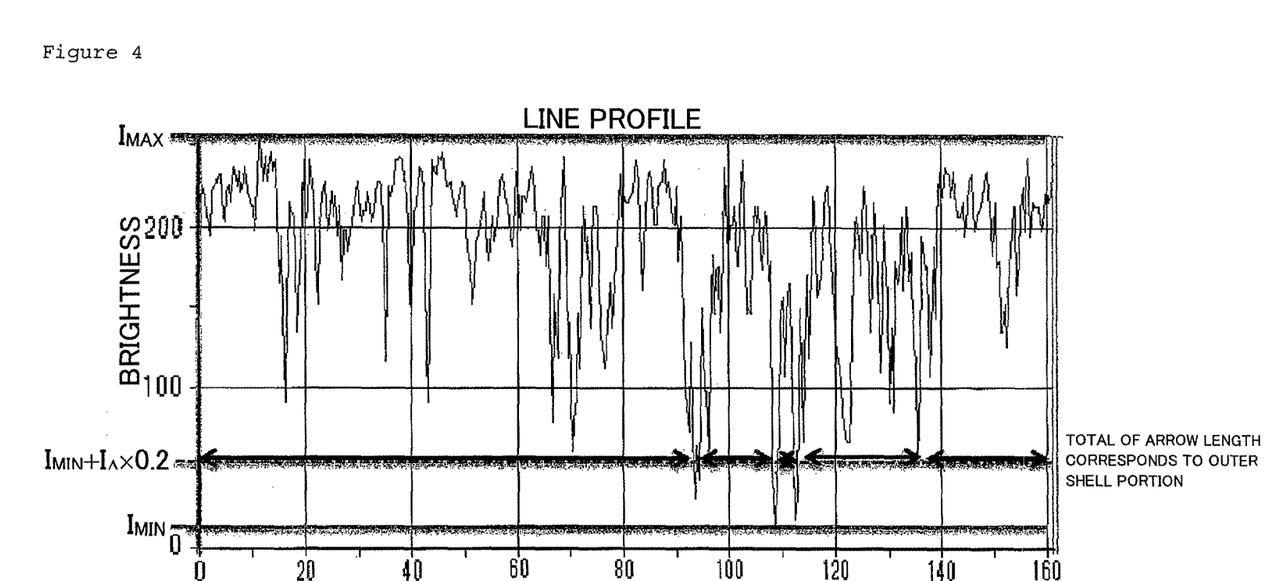
FIG. 4 is an image analyzed graph of the image in FIG. 3.

The thickness of the outer shell structure is determined by observing the cross-section of ferrite particles embedded in a resin with SEM and image-processing the image as shown in FIGS. 1 and 3, and will be described in detail later.

<Determination of the Thickness of the Outer Shell Structure>

The thickness of the outer shell structure of the ferrite particles is determined by the following procedures.

After molding ferrite particles embedded in a resin, the cross section is polished with the polishing machine and subjected to gold vapor deposition to prepare the specimen for observing the cross section (for determining the thickness of the outer shell structure). SEM image of the ferrite particles is photographed with JSM-6060A manufactured by JEOL Ltd., at the accelerating voltage of 5 kV, with the visual field of 200 magnifications. The image data is introduced into the image analyzing software (Image-Pro PLUS) manufactured by Media Cybernetics Inc., through the interface for analyzation. More specifically, after adjusting the contrast of the image, the brightness of the image is extracted for each particle by using the line profile function of the analyzing software. At this time, the straight line profile passing through the approximate center of the particle in the horizontal direction is drawn. Among the peaks present on the line profile, the peak corresponding to the outer shell structure is sandwiched between two markers, and the width is determined to be the thickness of the outer shell structure. The peak is defined by the maximum values between the minimum values in the line profile. The contrast of the image is preferable to be adjusted to make brightness of the embedding resin portion (corresponding to background) 50% or less relative to the maximum brightness. The same procedures are carried out on 30 particles in the same manner, and the average is determined to be the thickness of the outer shell structure.

The proportion of the outer shell structure in the circumferential length is determined from the cross-sectional image of the ferrite particles embedded in the resin observed with SEM and image-processing the image as shown in FIGS. 1 and 3.

<Determination of Proportion of the Outer Shell Structure in Outer Peripheral Direction>

The image is processed in the same manner as described above, and a line profile of circular or free-form curve (closed curve) is set for the outer shell structure of the particles. On this occasion, if the maximum brightness of the profile is represented by $I_{max}$, the minimum brightness is represented by $I_{max}$, and the difference between the maximum brightness and the minimum brightness is represented by $I_\Delta$, the range from $I_{min}$ or more to less than $I_{min}+I\Delta\times0.2$ is determined as the portion having no outer shell structure, and the range from $I_{min}+I\Delta\times0.2$ or more to $I_{max}$ or less is determined as the outer shell portion. Among the brightness data in the line profile length (circumferential length) obtained by the line profile function, the line profile lengths having the brightness of $I_{min}+I\Delta\times0.2$ or more to $I_{max}$ or less are integrated and divided by the line profile length (circumferential length), and the proportion of the outer periphery having the thickness in the certain range can be determined by the calculation. The same procedures are carried out for 30 particles, and the average is assumed to be the proportion of the outer periphery in the circumferential length (=density of the outer periphery).

(Determination of Proportion of Porous Portion in Internal Part of Particle)

The same image processing as described above is carried out with the straight line profile set to pass through the approximate center of each particle. On this occasion, if the maximum brightness of the profile is represented by $I_{max}$, the minimum brightness is represented by $I_{min}$, and the difference between the maximum brightness and the minimum brightness is represented by $I\Delta$, the range from $I_{min}$ or more to less than $I_{min}+I\Delta\times0.2$ is determined as the portion without ferrite, and the range from $I_{min}+I\Delta\times0.2$ or more to $I_{max}$ is determined as the portion of ferrite. Among the brightness data in the line profile length (straight line) obtained by the ling profile function, the line profile lengths having the brightness of $I_{min}+I\Delta\times0.2$ or more to $I_{max}$ or less are integrated and divided by the line profile length (straight line) to determine the proportion of the ferrite portion in the internal part of the particle by the calculation. The same procedures are carried out for 30 particles, and the average is assumed to be the density of the internal part of the particle.

Reduction of the apparent density achieved mainly in the conventional ferrite particles is just making of the ferrite particles porous. Making of the ferrite particles porous is easily achieved by changing firing conditions in final firing. However, the pores characteristic in the porous material are uniformly formed in the whole region from the surface to the internal part. As a result, if the properties should be controlled by resin coating or resin impregnation, as a large amount of resin is present on the surface of particles, control of properties is extremely difficult due to the large effect of the resin used in coating or impregnation.

Although the shape of the ferrite particles according to the present invention is similar to that of the conventional spherical particles at a first glance, the density of the ferrite particles according to the present invention are different between the outer shell structure and the internal part of the particle having a porous structure. More specifically, the ferrite particles have a large pore volume due to the small density of the internal part of the ferrite particles and a large pore diameter due to the large density of the outer shell structure. In addition, the ferrite particles provided with an outer shell structure have a smaller apparent density in comparison with the conventional porous core. In addition, as the outside of the ferrite particles is connected to the internal part through localized pores, the internal part of the particle is impregnated with a suspension including dispersed resin or functional nanoparticles, with the maintained exposed surface of the ferrite particles, even though the apparent density is small. As a result, the outer shell structure and the internal porous part can have individual functions, and properties which have not been achieved in the conventional ferrite particles are achieved.

The ferrite particles according to the present invention is preferable to contain 0.5 to 4 wt % of Mg and 3 to 20 wt % of Mn.

The ferrite particles according to the present invention is preferable to contain 47 to 70 wt % of Fe.

The ferrite particles according to the present invention is preferable to contain 0.5 to 4.5 wt % of Ti.

If the ferrite particles according to the present invention contain Mg, the magnetization control in the ferrite particles is made easy. If Mg content is less than 0.5 wt %, the effect of Mg is weak and the magnetization control is not sufficient. If Mg content exceeds 4 wt %, the magnetization decreases and use in applications based on magnetic properties is made difficult.

If the ferrite particles according to the present invention contain Mn, the magnetization control and the electric resistivity control of the ferrite particles is made easy. If Mn content is less than 3 wt %, the effect of Mn is weak, and the magnetization control is not sufficient. If Mn content exceeds 20 wt %, the amount is close to the stoichiometry of Mn ferrite, and the effect of Mn decreases to make Mn content meaningless. If Mn is contained, firing temperature controls the magnetization even though the specific oxygen concentration is equal.

If both of Mn and Mg is contained, it is preferable from the viewpoint of precise control of firing temperature. In other words, the magnetization of ferrite particles is roughly controlled by the content of Mg, and Mn content control the relation between firing temperature and magnetization more precise.

If the ferrite particles contain Mg in use as a carrier for electrophotographic developer, the developer composed of the ferrite carrier made of the ferrite particles and the full-color toners is excellent in charging start. In addition, the electric resistivity is made large. If Mg content is less than 0.5 wt %, sufficient effect of Mg is not achieved and the electric resistivity decreases to worsen the image quality by generation of fogging and poor gradation. If the ferrite carrier is used for electrophotographic developer, excessively large magnetization harden the tip of a magnetic brush to generate image defects such as brush streak marks. If Mg content exceeds 4 wt %, not only the carrier scattering occurs due to smaller magnetization, but also the moisture adsorption increases due to the effect of hydroxyl group originating from Mg if the firing temperature is low. As a result, the environmental dependency of electrical properties such as the charge amount and the electric resistivity are made poor.

If Fe content in the ferrite particles according to the present invention is less than 47 wt %, no outer shell structure is provided. If Fe content exceeds 70 wt %, no effect of containing Mg is achieved, and the ferrite particles might be the magnetite.

The ferrite particles according to the present invention is preferable to contain 0.5 to 4.5 wt % of Ti. As Ti lowers the firing temperature, not only the aggregated particles are reduced, but also surface properties uniform and wrinkled is achieved. If Ti content in the ferrite particles is less than 0.5 wt %, no effect of containing Ti is achieved, and the ferrite particles without the outer shell structure is prepared. Ti content of exceeding 4.5 wt % is not preferable because use in applications based on magnetic properties of ferrite particles is made difficult even though the outer shell structure is provided.

The difference between the Ti content in the ferrite particles according to the present invention and the Ti content in ferrite particles without the outer shell structure, i.e., the difference in Ti content between the vicinity of the surface of particle and the internal part of particle, is preferable to be 0.5 to 4.5 wt %.

If difference in Ti content is less than 0.5 wt %, no outer shell structure can be formed due to the small coating amount of composite oxide particles. If difference exceeds 4.5 wt %, the magnetization tends to decrease, and is not preferable because use in applications based on magnetic properties is made difficult.

Ti contained in an outer shell structure is detected by the elemental mapping analysis on the cross-sectional SEM specimen with EDX. Ti oxides include not only $TiO_2$, but also compounds, solid solution of one or more elements constituting the matrix of ferrite particle such as Fe—Ti oxides, Mg—Ti oxides, Sr—Ti oxides, Mn—Ti oxides, Mg—Fe—Ti oxides, Mg—Mn—Ti oxides, Sr—Fe—Ti oxides, Sr—Mn—Ti oxides, Sr—Mg—Ti oxides, Fe—Mn—Ti oxides, Fe—Mn—Mg—Ti oxides, Sr—Mn—Mg—Ti oxides, Sr—Fe—Mg—Ti oxides, and Sr—Fe—Mn—Ti oxides.

The ferrite particles according to the present invention is preferable to contain 0 to 1.5 wt % of Sr. Sr not only contributes to adjusting the electric resistivity and the surface properties with the large magnetization, but also enhancing the charging ability in the ferrite particles. The effect is particularly large in combination with Ti. If Sr content exceeds 1.5 wt %, as the residual magnetization and the coercive force increase, use in applications based on soft magnetic properties is made difficult.

<Determination of the Contents of Fe, Mg, Ti and Sr>

The contents of Fe, Mg, Ti and Sr are determined as follows.

Ferrite particles (ferrite carrier core material) in an amount of 0.2 g is weighed and completely dissolved in 60 ml of pure water with addition of 20 ml of 1 N hydrochloric acid and 20 ml of 1 N nitric acid with heating. The content of Fe, Mg, Ti and Sr in the aqueous solution is determined by using the ICP analyzer (ICPS-1000IV manufactured by Shimadzu Corporation).

The ferrite particle according to the present invention is preferable to have the magnetization of 55 to 85 $Am^2/kg$ in the applied magnetic field of 5K·1000/4πA/m in the VSM examination. If the magnetization of the ferrite particles is less than 55 $Am^2/kg$ at 5K·1000/4πA/m, use in applications based on the magnetic properties is made insufficient. The magnetization of ferrite particles having the composition according to the present invention never exceed 85 $Am^2/g$ kg at 5K·1000/4πA/m.

<Determination of the Magnetic Properties>

The magnetic properties are examined by the vibrating sample magnetometer (model: VSM-C7-10A (manufactured by Toei Industry Co., Ltd.)). The cell having the inner diameter of 5 mm and the height of 2 mm is filled with the ferrite particles and set in the apparatus. In the examination, applied magnetic field is swept up to 5K·1000/4π·A/m. Then, the applied magnetic field is reduced to draw the hysteresis curve on the recording paper. Based on the hysteresis curve, the magnetization under the applied magnetic field of 5K·1000/4π·A/m is determined. The residual magnetization and the coercive force are determined in the same manner.

The volume average particle diameter of the ferrite particles according to the present invention examined by a laser diffraction particle size distribution examiner is preferable to be 10 to 100 μm, more preferable to be 15 to 50 μm, most preferable to be 20 to 50 μm. If the volume average particle diameter of the ferrite particles is less than 10 μm, as the portion small in the density in the internal part of ferrite particles decreases relatively, and the ferrite particles prepared may not have the sufficiently small apparent density. Although the outer shell structure may be provided on the ferrite particles having the volume average particle diameter exceeding 100 μm, the diameter is preferably 100 μm or less from the viewpoint of reducing voids in densely filled specified volume.

<Determination of the Volume Average Particle Diameter>

The volume average particle diameter is examined by the laser diffraction/scattering method. The micro track particle size analyzer (Model 9320-X100) manufactured by Nikkiso Co., Ltd is used as the apparatus. The refractive index is assumed to be 2.42, and the examination is carried out under the environment at 25±5° C. and the relative humidity of 55±15%. The volume average particle diameter (median diameter) refers to the cumulative 50% particle diameter under the sieve in the volume distribution mode. Water is used as a dispersion medium.

BET specific surface area of the ferrite particles according to the present invention is preferable to be 0.2 to 1 m²/g, more preferable to be 0.2 to 0.85 m²/g.

BET specific surface area of less than the range is not preferable because the ferrite particles have the internal part densely filled without sufficient outer shell structure. If BET specific surface area exceeds the range, the ferrite particles prepared are porous without the outer shell structure. Note that in examination of BET specific surface area, the examination results may be influenced by the moisture on the surface of the ferrite particles. So, the pre-treatment is preferable to remove the moisture put on the surface of the ferrite particles as much as possible.

<Determination of BET Specific Surface Area>

BET specific surface area is examined with the BET specific surface area analyzer (Macsorb HM model 1208 (manufactured by Mountech Co.)). The ferrite particles in an amount of about 5 to 7 g is placed in the standard sample cell for the exclusive use in the specific surface area analyzer and weight of the ferrite particles is accurately weighed with an analytical balance. The ferrite particles in the standard sample cell is set in the examination port to start the examination. The examination is carried out by the one-point method. After finishing the examination, input of the weight of the ferrite particles starts calculation of the BET specific surface area automatically. As a pre-treatment before examination, the ferrite particles in an amount of about 20 g is taken onto a medicine wrapping paper and then degassed to −0.1 MPa with a vacuum dryer. After reaching the degree of vacuum −0.1 MPa or less, the ferrite particles is heated at 200° C. for 2 hours.

Environment: temperature at 10 to 30° C., relative humidity at 20 to 80%, without condensation.

The electric resistivity of the ferrite particles according to the present invention at the applied voltage of 50 V for the 6.5-mm gap is preferable to be $5 \times 10^7$ to $1 \times 10^{11} \Omega$.

If the electric resistivity of the ferrite particles is less than $5 \times 10^7 \Omega$ at the applied voltage of 50 V with the 6.5-mm gap, the ferrite composition may be close to magnetite, or providing of the outer shell structure is not sufficient because of less amount of Ti oxide. If the electric resistivity of the ferrite particles exceeds $1 \times 10^{11} \Omega$, amount of Ti in the outer shell structure provided on the ferrite particles is too large and the magnetization may be poor.

<Determination of the Electric Resistivity>

The electric resistivity is determined as follows.

Non-magnetic parallel plate electrodes (10 mm by 40 mm) are opposed with the 6.5-mm gap, and the gap is filled with 200 mg of ferrite particles (ferrite particles) weighed. The magnet (surface magnetic flux density: 1500 Gauss, magnet area in contact with electrode: 10 mm by 30 mm) is attached to the parallel plate electrodes to hold the ferrite particles between the electrodes. Voltages of 50 V, 100 V, 250 V, 500 V and 1000 V are applied to examine the electric resistivity at the applied voltages with the insulation resistivity meter (SM-8210 manufactured by DKK-TOA Corporation).

The ferrite particles are preferable to have the pore volume of 0.06 to 0.2 ml/g (60 to 200 μl/g) and the peak pore diameter of 0.7 to 2 μm.

If the pore volume of ferrite particles is less than 0.06 ml/g (60 μl/g), the apparent density of the ferrite particles is not small because the pores in the internal part of the ferrite particles are small. If the pore volume of ferrite particles exceeds 0.2 ml/g (200 μl/g), the apparent density is excessively small to cause problems in applications based on magnetic properties of the ferrite particles because the magnetic force of the ferrite particles as a magnetic powder is poor.

If the peak pore diameter of the ferrite particles exceeds 2 μm, the apparent density of the ferrite particles is not small and sufficient properties may not be achieved in applications utilizing the portion having the small density in the internal part of the ferrite particles. If the peak pore diameter of ferrite particles is less than 0.7 μm, the ferrite particles might be porous without the outer shell structure, and use in applications separately utilizing functions of the internal part and outer shell structure of the ferrite particles may be made difficult.

If the pore volume and the peak pore diameter are in the ranges, the suitably light weight ferrite particles without problems described above is prepared.

<Determination of the pore diameter and the pore volume of ferrite particles>

The pore diameter and the pore volume of the ferrite particles are determined as follows. Mercury porosimeters Pascal 140 and Pascal 240 (manufactured by Thermo Fisher Scientific Inc.) are used in the examination. Using CD3P (for powder use) as the dilatometer, the ferrite particles put in the commercially available gelatinous capsule having the plurality of open holes is placed in the dilatometer. The first run for the examination in the low-pressure region (0 to 400 kPa) is carried out with the steps, degassing of Pascal 140, and filing of mercury. The second run repeats the steps in the low-pressure region. After finishing the second run, the total weight of the dilatometer, mercury, the capsule, and the ferrite particles is examined. Then, the examination in the high-pressure region (0.1 MPa to 200 MPa) is carried out using Pascal 240. Based on the amount of mercury press fitted in the examination, the pore volume, the pore diameter distribution, and the peak pore diameter of the ferrite particles are determined. In the calculation for determination of the pore diameter, the surface tension of mercury is assumed to be 480 dyn/cm and the contact angle is assumed to be 141.3°.

<Method of Manufacturing the Ferrite Particles According to the Present Invention>

The method of manufacturing the ferrite particles according to the present invention will be described below.

The method of manufacturing the ferrite particles according to the present invention is carried out as follows, for example.

(Preparation of Particles for the Ferrite Core Material)

The compounds of Fe, Mn and Mg, and the compounds of Sr, Ti according to needs are pulverized, mixed, calcined, and pulverized with the rod mill to prepare the calcined ferrite powder.

The preferable composition of the calcined ferrite powder is 45 to 68 wt % of Fe, 0.5 to 4 wt % of Mg, 3 to 22 wt % of Mn, 0.25 to 6 wt % of Ti, and 0 to 2 wt % of Sr, for example.

If the calcined ferrite powder satisfies the composition described above, various properties necessary and sufficient for ferrite particles corresponding to applications are achieved by coating with Ti compounds followed by firing.

Water and, a dispersant and a binder according to needs are added to the calcined ferrite powder to prepare the slurry. After viscosity adjustment of the slurry, granulation is carried out using the spray dryer. The granulated particles are subjected to binder removing to prepare the uncoated ferrite particle. The binder removing is carried out at 600 to 1000° C.

The slurry particle diameter $D_{50}$ of the slurry is preferable to be 0.5 to 4.5 μm. If the slurry particle diameter is in the range, the ferrite particles prepared have the desired BET specific surface area. If the slurry particle diameter $D_{50}$ is less than 0.5 μm, the specific surface area of the calcined ferrite powder increases excessively after pulverization, and excess firing proceeds in final firing of the particles for the ferrite core material coated with $TiO_2$ particles for coating. As a result, the desired BET specific surface area is hardly achieved in the ferrite particles prepared. If the slurry particle diameter $D_{50}$ exceeds 4.5 μm, desired ferrite particles may not be prepared due to insufficient formation of the outer shell structure even though the ferrite particles coated with $TiO_2$ particles for coating are fired.

The slurry particle diameter in the range may be achieved by controlling the pulverization time in preparation of the slurry for the granulation, selecting the pulverization medium to prepare the intended slurry particle diameter and particle size distribution, or classifying the raw material particles in the slurry with the wet cyclone. If the wet cyclone is employed, as the solid content in the slurry changes after classification, solid content should be adjusted. However, as the wet cyclone achieves the intended slurry diameter in a short time, the wet cyclone may be used in combination with the controlled pulverization time.

The volume average particle diameter of the $TiO_2$ particles for coating is preferable to be 0.05 to 3 μm. If the particle diameter is less than 0.05 μm, the $TiO_2$ particles for coating tend to aggregate if the $TiO_2$ particles for coating are attached on the surface of the uncoated ferrite particle. As a result, the ferrite particles may include a part without the outer shell structure even though the surface of the uncoated ferrite particle is coated with the desired amount of the $TiO_2$ particles for coating because the coated layer is irregular. If the particle diameter exceeds 3 μm, uniform attaching on the uncoated ferrite particle is made difficult, and the ferrite particles may include the part without outer shell structure.

Amount of the $TiO_2$ particles for coating is preferable to be 0.8 to 7 wt % relative to the uncoated ferrite particle. However, the amount depends on the volume average particle diameter. If the amount is less than 0.8 wt %, sufficient electric resistivity cannot be achieved after final firing. If the amount exceeds 7 wt %, the $TiO_2$ particles for coating not attached on the uncoated ferrite particle may aggregates each other and the ferrite particles small in magnetization may generate. Small magnetization may cause problems in applications based on magnetic properties of the ferrite particles.

(Preparation of the Ferrite Particles)

To the uncoated ferrite particle, $TiO_2$ particles for coating are added and mixed with the mixing mill to prepare the raw material for the ferrite particles. The raw material for the ferrite particles is subjected to final firing at 850 to 1230° C. under the inert atmosphere or the weak oxidizing atmosphere such as the nitrogen atmosphere or the mixed gas atmosphere of nitrogen and oxygen with the oxygen concentration of 3 vol % or less.

The fired material is pulverized and classified to prepare the ferrite particles. The particle size is adjusted to the desired particle diameter by the conventional classification method such as wind classification, mesh filtration and sedimentation. If the dry collection is employed, the collection may be carried out with the cyclone.

The ferrite particles according to the present invention having the properties are thus prepared.

In the ferrite particles according to the present invention, the $Tio_2$ particles for coating to be attached on the surface of the uncoated ferrite particle may be surface treated for electro static charge to improve dispersibility. The surface treatment for electro static charge reduces the aggregation of the $TiO_2$ particles for coating. As a result, attaching of the $Tio_2$ particles for coating is made easy. In addition, if the surface treatment agent giving the polarity reverse to the charging polarity of the uncoated ferrite particle is used, the surface treatment prevents the detachment of the $TiO_2$ particles for coating attached on the uncoated ferrite particle.

The method of attaching the $Tio_2$ particles for coating on the surface of the uncoated ferrite particle is described above. If the dry method of attaching the $TiO_2$ particles for coating on the surface of the uncoated ferrite particle without subjecting to the pre-treatment for electro static charge, the $TiO_2$ particles for coating might be in severe aggregation, and the situation causes difficulty in attaching on the uncoated ferrite particle or results large deviation in the composition because the large aggregates attach. So, the properties of the finally fired ferrite particles may be poor.

If the wet method is employed for coating of the $TiO_2$ particles for coating on the surface of the uncoated ferrite particle, as the solvent for the whole raw materials for the uncoated ferrite particle should be removed, the large-scale processing required is expensive. If the dry method is employed for attaching of the $TiO_2$ particles for coating on the uncoated ferrite particle, as just the $Tio_2$ particles for coating should be surface treated, it is easily carried out with less cost.

<Catalyst According to the Present Invention>

In the catalyst according to the present invention, the ferrite particles support a catalytically active component (catalyst particle) as a catalyst supporting medium. The active catalyst component is preferable to be at least one colloidal particle of the metal selected from gold, silver, copper, platinum, rhodium, ruthenium, palladium, nickel, and cobalt.

The present invention will be more specifically described with reference to Examples and Comparative Examples as follows.

Example 1

<Preparation of the Ferrite Particles>

100 mol of $Fe_2O_3$, 10 mol of $MgCO_3$, 13.3 mol of $Mn_3O_4$ and 1 mol of $SrCO_3$ were weighed as the raw material and carbon black was added in the amount of 1.35 wt % relative to the raw materials as the reducing agent and mixed, pulverized, and pelletized with the roller compactor. The pellets were calcined in the rotary calcination furnace at 980° C. under the nitrogen atmosphere with the oxygen concentration of 0 volt. The calcined material was pulverized with the rod mill to prepare the calcined ferrite powder for the ferrite core material.

The calcined ferrite powder for the ferrite core material was pulverized for 1 hour with the wet bead mill. PVA was added in the amount of 1 wt % relative to the slurry solid content as the binder, and the polycarboxylic acid-based dispersant was added to adjust the slurry viscosity 2 to 3 poise. At this time, the slurry particle diameter $D_{50}$ was 3.259 μm.

The pulverized slurry was granulated and dried with the spray dryer, and the binder removing treatment was carried out at 850° C. with the rotary kiln under the nitrogen atmosphere with the oxygen concentration of 0 vol % to prepare particles for the ferrite core material.

The particles for a ferrite core material was added 4 wt % of the $TiO_2$ particles for coating, and mixed and stirred for 10 minutes with the mixing mill. The aggregates of the mixture were loosened with an 80-mesh vibrating sieve to prepare the raw material for the ferrite particles.

The raw material for the ferrite particles was kept at 1010° C. for 4 hours under the nitrogen atmosphere with the oxygen concentration of 0 vol % in the electric furnace for final firing. The fired material was de-agglomerated and classified to prepare the ferrite particles.

Example 2

The ferrite particles were prepared in the same manner as in Example 1, except that 100 mol of $Fe_2O3$, 5 mol of $MgCO_3$, 26.6 mol of $Mn_3O4$, and 0 mol of $SrCO_3$ were weighed.

Example 3

The ferrite particles were prepared in the same manner as in Example 1, except that 100 mol of $Fe_2O3$, 20 mol of $MgCO_3$, 6.65 mol of $Mn_3O_4$, and 0 mol of $SrCO_3$ were weighed.

Example 4

The ferrite particles were prepared in the same manner as in Example 1, except that 100 mol of $Fe_2O3$, 5 mol of $MgCO_3$, 5 mol of $Mn_3O4$, and 0 mol of $SrCO_3$ were weighed.

Example 5

The ferrite particles were prepared in the same manner as in Example 1, except that 100 mol of $Fe_2O3$, 20 mol of $MgCO_3$, 26.6 mol of $Mn_3O_4$, and 0 mol of $SrCO_3$ were weighed.

Example 6

The ferrite particles were prepared in the same manner as in Example 1, except that amount of $SrCO_3$ was 0 mol and the amount of $TiO_2$ particles for coating added was 2.5 wt % relative to the particles for the ferrite core material.

Example 7

The ferrite particles were prepared in the same manner as in Example 1, except that amount of $SrCO_3$ was 0 mol and amount of $TiO_2$ particles for coating added was 5 wt % relative to the particles for the ferrite core material.

Example 8

The ferrite particles were prepared in the same manner as in Example 6, except that the final firing temperature was 950° C.

Example 9

The ferrite particles were prepared in the same manner as in Example 6, except that the final firing temperature was 1050° C.

Comparative Example 1

The ferrite particles were prepared in the same manner as in Example 1, except that amount of $SrCO_3$ was 0 mol and the final firing temperature was 920° C.

Comparative Example 2

The ferrite particles were prepared in the same manner as in Example 1, except that amount of $SrCO_3$ was 0 mol and no $TiO_2$ particle for coating was added to the particles for a ferrite core material.

Comparative Example 3

The ferrite particles were prepared in the same manner as in Example 1, except that amount of $SrCO_3$ was 0 mol and the final firing temperature was 1165° C.

Table 1 shows the blending ratio of the raw materials for the ferrite particles charged (molar ratio of raw material charged), the amount of carbon, the calcination conditions (calcination temperature and calcination atmosphere), the final granulation conditions (slurry particle diameter and amount of PVA added), the binder removing conditions (treatment temperature and treatment atmosphere), the mixing conditions of $TiO_2$ (the amount added and mixing conditions) and the final firing conditions (final firing temperature and final firing atmosphere) in Examples 1 to 9 and Comparative Examples 1 to 3. Table 2 shows the composition, the magnetic properties (magnetization, residual magnetization and coercive force) and the shape of the ferrite particles prepared (cross-sectional shape, proportion of the outer shell structure in the length of circumference, thickness of the outer shell structure, and the proportion of ferrite in internal part of particles). Table 3 shows the powder properties (BET specific surface area, average particle diameter, apparent density, true density, pore volume and peak pore diameter) and the electric resistance with 6.5 mm-gap (50 V, 100 V, 250 V, 500 V, and 1000 V) of the ferrite particles in Examples 1 to 9 and Comparative Examples 1 to 3. The determination methods are as described above.

TABLE 1

| | Ratio of raw materials charged (mol) | | | | | Amount of carbon black *1 (wt %) | Calcination condition | | Final granulation condition Slurry particle diameter ($D_{50}$) (μm) |
|---|---|---|---|---|---|---|---|---|---|
| | $Fe_2O_3$ | $MgCO_3$ | $Mn_3O_4$ | $TiO_2$ | $SrCO_3$ | | Temperature (° C.) | Atmosphere (vol %-$O_2$) | |
| Example 1 | 100 | 10 | 13.3 | 0 | 1 | 1.35 | 980 | 0 | 3.259 |
| Example 2 | 100 | 5 | 26.6 | 0 | 0 | 1.35 | 980 | 0 | 3.245 |
| Example 3 | 100 | 20 | 6.65 | 0 | 0 | 1.35 | 980 | 0 | 3.268 |
| Example 4 | 100 | 5 | 5 | 0 | 0 | 1.35 | 980 | 0 | 3.229 |
| Example 5 | 100 | 20 | 26.6 | 0 | 0 | 1.35 | 980 | 0 | 3.242 |
| Example 6 | 100 | 10 | 13.3 | 0 | 0 | 1.35 | 980 | 0 | 3.231 |
| Example 7 | 100 | 10 | 13.3 | 0 | 0 | 1.35 | 980 | 0 | 3.269 |
| Example 8 | 100 | 10 | 13.3 | 0 | 0 | 1.35 | 980 | 0 | 3.24 |
| Example 9 | 100 | 10 | 13.3 | 0 | 0 | 1.35 | 980 | 0 | 3.274 |
| Comparative Example 1 | 100 | 10 | 13.3 | 0 | 0 | 1.35 | 980 | 0 | 3.247 |
| Comparative Example 2 | 100 | 10 | 13.3 | 0 | 0 | 1.35 | 980 | 0 | 3.236 |
| Comparative Example 3 | 100 | 10 | 13.3 | 0 | 0 | 1.35 | 980 | 0 | 3.228 |

| | Final granulation condition Amount of PVA added (10 wt % aqueous solution) | Binder removing condition | | $TiO_2$ mixing condition | | Final firing condition | |
|---|---|---|---|---|---|---|---|
| | | Temperature (° C.) | Atmosphere (vol %-$O_2$) | Amount added (wt %)*2 | Time (min) | Firing temperature (° C.) | Atmosphere (vol %-$O_2$) |
| Example 1 | 1 | 850 | 0 | 4 | 10 | 1010 | 0 |
| Example 2 | 1 | 850 | 0 | 4 | 10 | 1010 | 0 |
| Example 3 | 1 | 850 | 0 | 4 | 10 | 1010 | 0 |
| Example 4 | 1 | 850 | 0 | 4 | 10 | 1010 | 0 |
| Example 5 | 1 | 850 | 0 | 4 | 10 | 1010 | 0 |
| Example 6 | 1 | 850 | 0 | 2.5 | 10 | 1010 | 0 |
| Example 7 | 1 | 850 | 0 | 5 | 10 | 1010 | 0 |
| Example 8 | 1 | 850 | 0 | 2.5 | 10 | 950 | 0 |
| Example 9 | 1 | 850 | 0 | 2.5 | 10 | 1050 | 0 |
| Comparative Example 1 | 1 | 850 | 0 | 4 | 10 | 920 | 0 |
| Comparative Example 2 | 1 | 850 | 0 | 0 | 10 | 1010 | 0 |
| Comparative Example 3 | 1 | 850 | 0 | 4 | 10 | 1165 | 0 |

*1: Amount relative to the amount of the raw materials
*2 Amount relative to particles for ferrite core material

TABLE 2

| | Composition of ferrite particles (ICP) (wt %) | | | | | Magnetic properties at 5 K · 1000/4π · A/m (VSM) | | | Cross-sectional shape (SEM) | Shape of ferrite particles | | |
|---|---|---|---|---|---|---|---|---|---|---|---|---|
| | | | | | | | | | | Proportion of outer shell structure in circumferential length (%) | Thickness of outer shell structure (μm) | Proportion of ferrite in internal part of particles (%) |
| | Fe | Mg | Mn | Ti | Sr | Magnetization ($Am^2$/kg) | Residual magnetization ($Am^2$/kg) | Coercive force (A/m) | | | | |
| Example 1 | 56.36 | 1.23 | 11.06 | 1.95 | 0.59 | 72.66 | 3.27 | 35.97 | Core-shell form | 92 | 2.42 | 61 |
| Example 2 | 49.51 | 0.54 | 19.43 | 1.95 | 0.00 | 74.30 | 3.34 | 37.39 | Core-shell form | 90 | 1.87 | 55 |
| Example 3 | 60.41 | 2.63 | 5.43 | 1.95 | 0.00 | 67.63 | 3.04 | 33.29 | Core-shell form | 95 | 2.65 | 54 |
| Example 4 | 64.24 | 0.70 | 4.74 | 1.95 | 0.00 | 77.70 | 3.5 | 38.45 | Core-shell form | 96 | 2.53 | 58 |
| Example 5 | 48.01 | 2.09 | 11.84 | 1.95 | 0.00 | 66.64 | 3 | 32.78 | Core-shell form | 85 | 2.16 | 52 |
| Example 6 | 57.66 | 1.25 | 11.31 | 1.24 | 0.00 | 76.28 | 3.43 | 38.61 | Core-shell form | 96 | 2.33 | 65 |
| Example 7 | 56.50 | 1.23 | 11.09 | 2.42 | 0.00 | 71.08 | 3.2 | 35.83 | Core-shell form | 98 | 3.65 | 49 |

TABLE 2-continued

| | Composition of ferrite particles (ICP) (wt %) | | | | | Magnetic properties at 5 K · 1000/4π · A/m (VSM) | | | Cross-sectional shape (SEM) | Shape of ferrite particles | | |
|---|---|---|---|---|---|---|---|---|---|---|---|---|
| | | | | | | Magneti-zation | Residual magnetization | Coercive force | | Proportion of outer shell structure in circumferential length (%) | Thickness of outer shell structure (μm) | Proportion of ferrite in internal part of particles (%) |
| | Fe | Mg | Mn | Ti | Sr | (Am²/kg) | (Am²/kg) | (A/m) | | | | |
| Example 8 | 57.66 | 1.25 | 11.31 | 1.24 | 0.00 | 73.18 | 3.81 | 42.5 | Core-shell form | 95 | 2.4 | 73 |
| Example 9 | 57.66 | 1.25 | 11.31 | 1.24 | 0.00 | 77.66 | 3.05 | 29.3 | Core-shell form | 94 | 2.59 | 45 |
| Comparative Example 1 | 56.96 | 1.24 | 11.18 | 1.95 | 0.00 | 68.38 | 4.23 | 46.22 | Porous | Examination failed* | Examination failed* | 73 |
| Comparative Example 2 | 58.87 | 1.28 | 11.55 | 0.00 | 0.00 | 81.70 | 3.68 | 40.3 | Porous | Examination failed* | Examination failed* | 65 |
| Comparative Example 3 | 56.96 | 1.24 | 11.18 | 1.95 | 0.00 | 78.56 | 2.98 | 32.31 | Granular | Examination failed* | Examination failed* | 96 |

*Absence of outer shell structure.

TABLE 3

| | Properties of ferrite particles | | | | | | | | | | |
|---|---|---|---|---|---|---|---|---|---|---|---|
| | BET specific surface area (m²/g) | Average particle diameter (μm) | Apparent density (g/cm³) | True density (g/cm³) | Pore volume (μl/g) | Peak pore diameter (μm) | Electric resistivity (6.5-mm Gap) (Ω) | | | | |
| | | | | | | | 50 V | 100 V | 250 V | 500 V | 1000 V |
| Example 1 | 0.3413 | 29.66 | 1.23 | 4.69 | 131.220 | 0.992 | $2.9 \times 10^9$ | $1.3 \times 10^9$ | $5.4 \times 10^8$ | $2.4 \times 10^7$ | Examination failed |
| Example 2 | 0.3653 | 29.54 | 1.42 | 4.66 | 137.330 | 0.948 | $8.5 \times 10^8$ | $7.0 \times 10^8$ | $9.5 \times 10^7$ | $6.5 \times 10^6$ | Examination failed |
| Example 3 | 0.3005 | 29.32 | 1.16 | 4.72 | 120.490 | 1.080 | $3.4 \times 10^9$ | $1.8 \times 10^9$ | $6.4 \times 10^8$ | $3.6 \times 10^7$ | Examination failed |
| Example 4 | 0.392 | 29.60 | 1.35 | 4.78 | 143.980 | 0.904 | $7.8 \times 10^9$ | $4.3 \times 10^8$ | $2.2 \times 10^6$ | Examination failed | Examination failed |
| Example 5 | 0.2926 | 29.29 | 1.51 | 4.63 | 118.360 | 1.100 | $5.6 \times 10^9$ | $3.8 \times 10^9$ | $8.7 \times 10^8$ | $6.2 \times 10^7$ | Examination failed |
| Example 6 | 0.3823 | 29.74 | 1.21 | 4.73 | 141.580 | 0.919 | $5.8 \times 10^7$ | $3.8 \times 10^7$ | $2.7 \times 10^6$ | Examination failed | Examination failed |
| Example 7 | 0.3374 | 29.45 | 1.18 | 4.70 | 130.210 | 1.000 | $1.5 \times 10^{10}$ | $8.5 \times 10^9$ | $7.5 \times 10^7$ | Examination failed | Examination failed |
| Example 8 | 0.4724 | 29.58 | 1.01 | 4.73 | 163.150 | 0.798 | $9.0 \times 10^7$ | $6.4 \times 10^7$ | $2.0 \times 10^6$ | Examination failed | Examination failed |
| Example 9 | 0.2569 | 29.71 | 1.62 | 4.73 | 108.480 | 1.200 | $3.5 \times 10^9$ | $2.1 \times 10^9$ | $7.2 \times 10^8$ | $1.4 \times 10^7$ | Examination failed |
| Comparative Example 1 | 0.5766 | 29.42 | 0.97 | 4.86 | 86.460 | 0.498 | $3.8 \times 10^7$ | $6.9 \times 10^6$ | Examination failed | Examination failed | Examination failed |
| Comparative Example 2 | 0.4373 | 29.42 | 1.09 | 4.91 | 74.920 | 0.840 | $1.3 \times 10^7$ | $7.5 \times 10^6$ | $1.6 \times 10^6$ | Examination failed | Examination failed |
| Comparative Example 3 | 0.0857 | 29.33 | 2.16 | 4.86 | 10.990 | 0.718 | $6.2 \times 10^8$ | $3.5 \times 10^8$ | $8.5 \times 10^7$ | $2.5 \times 10^7$ | $7.6 \times 10^6$ |

As shown in Table 2, the ferrite particles prepared in Examples 1 to 9 are provided with the outer shell structure.

In contrast, ferrite particles prepared in Comparative Example 1 are not provided with the outer shell structure due to the low firing temperature even though the porous structure is provided.

The ferrite particles prepared in Comparative Example 2 are not provided with the outer shell structure due to not having added $TiO_3$ particle for coating to the particles for a ferrite core material.

The ferrite particles prepared in Comparative Example 3 are not provided with the outer shell structure due to the high firing temperature.

Preparation of the Ferrite Particles for Supporting the Catalyst

Example 10

The ferrite particles prepared in Example 1 were impregnated with the colloidal gold solution to make amount of the colloidal particle 1 wt % relative to the amount of the ferrite particles. The ferrite particles after evaporation of the solvent of the colloidal solution were heat-treated at 700° C. under the nitrogen atmosphere for 6 hours using the inert oven. The ferrite particles after the heat-treatment (ferrite particles supporting the catalyst) were embedded in a resin, and ion milling was carried out to expose the cross section of the ferrite particles supporting the catalyst. The distribution of elements inside of the ferrite particles supporting the catalyst prepared was detected by EDX.

Example 11

The distribution of elements in the ferrite particles for supporting the catalyst was detected in the same manner as in Example 10, except that the colloidal gold solution was replaced with the colloidal silver solution.

Example 12

The distribution of elements in the ferrite particles supporting the catalyst was detected in the same manner as in Example 10, except that the colloidal gold solution was replaced with the colloidal copper solution.

Example 13

The distribution of elements in the ferrite particles supporting the catalyst was detected in the same manner as in Example 10, except that the colloidal gold solution was replaced with the colloidal platinum solution.

Example 14

The distribution of elements in the ferrite particles supporting the catalyst was detected in the same manner as in Example 10, except that the colloidal gold solution was replaced with the colloidal rhodium solution.

Example 15

The distribution of elements in the ferrite particles supporting the catalyst was detected in the same manner as in Example 10, except that the colloidal gold solution was replaced with the colloidal ruthenium solution.

Example 16

The distribution of elements in the ferrite particles supporting the catalyst was detected in the same manner as in Example 10, except that the colloidal gold solution was replaced with the colloidal palladium solution.

Example 17

The distribution of elements in the ferrite particles supporting the catalyst was detected in the same manner as in Example 10, except that the colloidal gold solution was replaced with the colloidal nickel solution.

Example 18

The distribution of elements in the ferrite particles supporting the catalyst was detected in the same manner as in Example 10, except that the colloidal gold solution was replaced with the colloidal cobalt solution.

Table 4 shows the ferrite particles for supporting the catalyst used in Examples 10 to 18, the type of colloidal solution (catalytically active component, solid content of catalyst particle, particle diameter), the impregnation into the ferrite particles (solvent, amount of colloidal particle relative to the ferrite particles, and heat treatment), and distribution of elements detected with EDX (supported nanoparticles).

TABLE 4

| | Ferrite particles for supporting the catalyst | Colloidal solutions | | | Impregnation into ferrite particles | | | Detection of elements by EDX. Supported nanoparticles |
|---|---|---|---|---|---|---|---|---|
| | | Catalytically active component | Solid content in the solution wt % | Diameter of colloid nm | Solvent | Weight of colloidal particle relative to ferrite particles wt % | Heat treatment ° C. | |
| Example 10 | Ferrite particles prepared in Example 1 | Gold | 0.1 | 8 | Methanol | 1 | 700 | ○ |
| Example 11 | | Silver | 0.1 | 10 | Methanol | 1 | 700 | ○ |
| Example 12 | | Copper | 0.1 | 15 | Methanol | 1 | 700 | ○ |
| Example 13 | | Platinum | 0.1 | 5 | Methanol | 1 | 700 | ○ |
| Example 14 | | Rhodium | 0.1 | 7 | Methanol | 1 | 700 | ○ |
| Example 15 | | Ruthenium | 0.1 | 10 | Methanol | 1 | 700 | ○ |
| Example 16 | | Palladium | 0.1 | 6 | Methanol | 1 | 700 | ○ |
| Example 17 | | Nickel | 0.1 | 8 | Methanol | 1 | 700 | ○ |
| Example 18 | | Cobalt | 0.1 | 8 | Methanol | 1 | 700 | ○ |

As shown in Table 4, the ferrite particles for supporting the catalyst in Examples 10 to 18 are confirmed that the ferrite particles according to the present invention can be used as the ferrite particles for supporting the catalyst because the catalytically active components are present not only on the surface of the ferrite particles but also inside of the ferrite particles.

INDUSTRIAL APPLICABILITY

As the ferrite particles according to the present invention have a small apparent density due to the outer shell structure provided, have various properties maintained in a controllable state and fill a specified volume with a small weight. So, if the ferrite particles are used as a catalyst supporting medium which supports a catalytically active component, suitable dispersion of the catalytically active component in the catalyst supporting medium is achieved.

The invention claimed is:
1. A ferrite particle comprising a ferrite core and an outer shell, the outer shell comprising Ti oxide, the outer shell having a thickness of 0.5 to 10 μm.
2. A plurality of the ferrite particles according to claim 1, wherein the plurality of ferrite particles have a volume average particle diameter from 10 to 100 μm, the volume average particle diameter determined from a cumulative 50% particle diameter under a sieve after measuring the plurality of ferrite particles dispersed in water in laser diffraction/scattering apparatus set to volume distribution mode under a refractive index of 2.42, 25° C., and a relative humidity of 55%.

3. A catalyst particle according to claim 1, further comprising a catalytically active component.

4. A catalyst particle according to claim 3, wherein the catalytically active component comprises a colloidal particle of at least one metal selected from the group consisting of gold, silver, copper, platinum, rhodium, ruthenium, palladium, nickel, and cobalt.

5. A ferrite particle comprising a ferrite core and an outer shell, the outer shell comprising Ti oxide, the density of the ferrite core being lower than the density of the outer shell structure.

6. A plurality of the ferrite particles according to claim 5, wherein the plurality of ferrite particles have a volume average particle diameter from 10 to 100 μm, the volume average particle diameter determined from a cumulative 50% particle diameter under a sieve after measuring the plurality of ferrite particles dispersed in water in laser diffraction/scattering apparatus set to volume distribution mode under a refractive index of 2.42, 25° C., and a relative humidity of 55%.

7. A catalyst comprising the ferrite particles for supporting a catalyst according to claim 5 and a catalytically active component.

8. The catalyst according to claim 7, wherein the catalytically active component comprises one colloidal particle of at least one metal selected from the group consisting of gold, silver, copper, platinum, rhodium, ruthenium, palladium, nickel, and cobalt.

9. A catalyst particle comprising a catalytically active component and a ferrite particle, the ferrite particle comprising a ferrite core and an outer shell, the outer shell comprising Ti oxide.

10. The catalyst particle according to claim 9, wherein the catalytically active component comprises a colloidal particle of at least one metal selected from the group consisting of gold, silver, copper, platinum, rhodium, ruthenium, palladium, nickel, and cobalt.

11. A plurality of the catalyst particles according to claim 10, wherein the plurality of catalysts particles have a volume average particle diameter from 10 to 100 μm, the volume average particle diameter determined from a cumulative 50% particle diameter under a sieve after measuring the plurality of ferrite particles dispersed in water in laser diffraction/scattering apparatus set to volume distribution mode under a refractive index of 2.42, 25° C., and a relative humidity of 55%.

12. A catalyst particle according to claim 10, wherein the outer shell has a thickness of 0.5 to 10 μm.

13. A plurality of catalyst particles according to claim 12, wherein the plurality of catalysts particles have a volume average particle diameter from 10 to 100 μm, the volume average particle diameter determined from a cumulative 50% particle diameter under a sieve after measuring the plurality of ferrite particles dispersed in water in laser diffraction/scattering apparatus set to volume distribution mode under a refractive index of 2.42, 25° C., and a relative humidity of 55%.

14. A catalyst particle according to claim 10, wherein the density of the ferrite core is lower than the density of the outer shell structure.

15. A plurality of the catalyst particles according to claim 9, wherein the plurality of catalysts particles have a volume average particle diameter from 10 to 100 μm, the volume average particle diameter determined from a cumulative 50% particle diameter under a sieve after measuring the plurality of ferrite particles dispersed in water in laser diffraction/scattering apparatus set to volume distribution mode under a refractive index of 2.42, 25° C., and a relative humidity of 55%.

16. A catalyst particle according to claim 9, wherein the outer shell has a thickness of 0.5 to 10 μm.

17. A plurality of catalyst particles according to claim 16, wherein the plurality of catalysts particles have a volume average particle diameter from 10 to 100 μm, the volume average particle diameter determined from a cumulative 50% particle diameter under a sieve after measuring the plurality of ferrite particles dispersed in water in laser diffraction/scattering apparatus set to volume distribution mode under a refractive index of 2.42, 25° C., and a relative humidity of 55%.

18. A catalyst particle according to claim 9, wherein the density of the ferrite core is lower than the density of the outer shell structure.

19. A plurality of catalyst particles according to claim 18, wherein the plurality of catalysts particles have a volume average particle diameter from 10 to 100 μm, the volume average particle diameter determined from a cumulative 50% particle diameter under a sieve after measuring the plurality of ferrite particles dispersed in water in laser diffraction/scattering apparatus set to volume distribution mode under a refractive index of 2.42, 25° C., and a relative humidity of 55%.

* * * * *